April 29, 1941.　　　A. W. SEYFRIED　　　2,240,150
SUCTION CLEANER MOTOR MOUNTING
Filed March 18, 1940　　　2 Sheets-Sheet 1
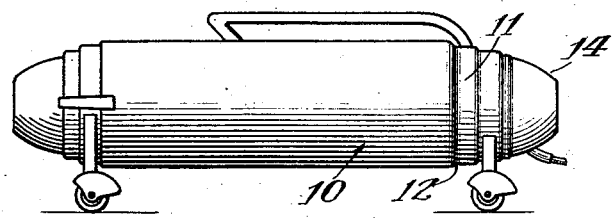
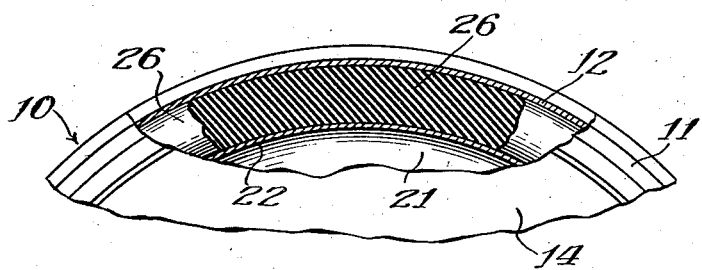
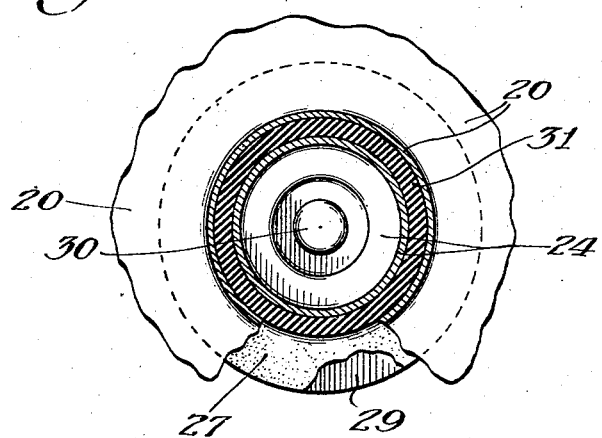
Inventor:
Arthur W. Seyfried,
By Bertha L. McGregor
Attorney.

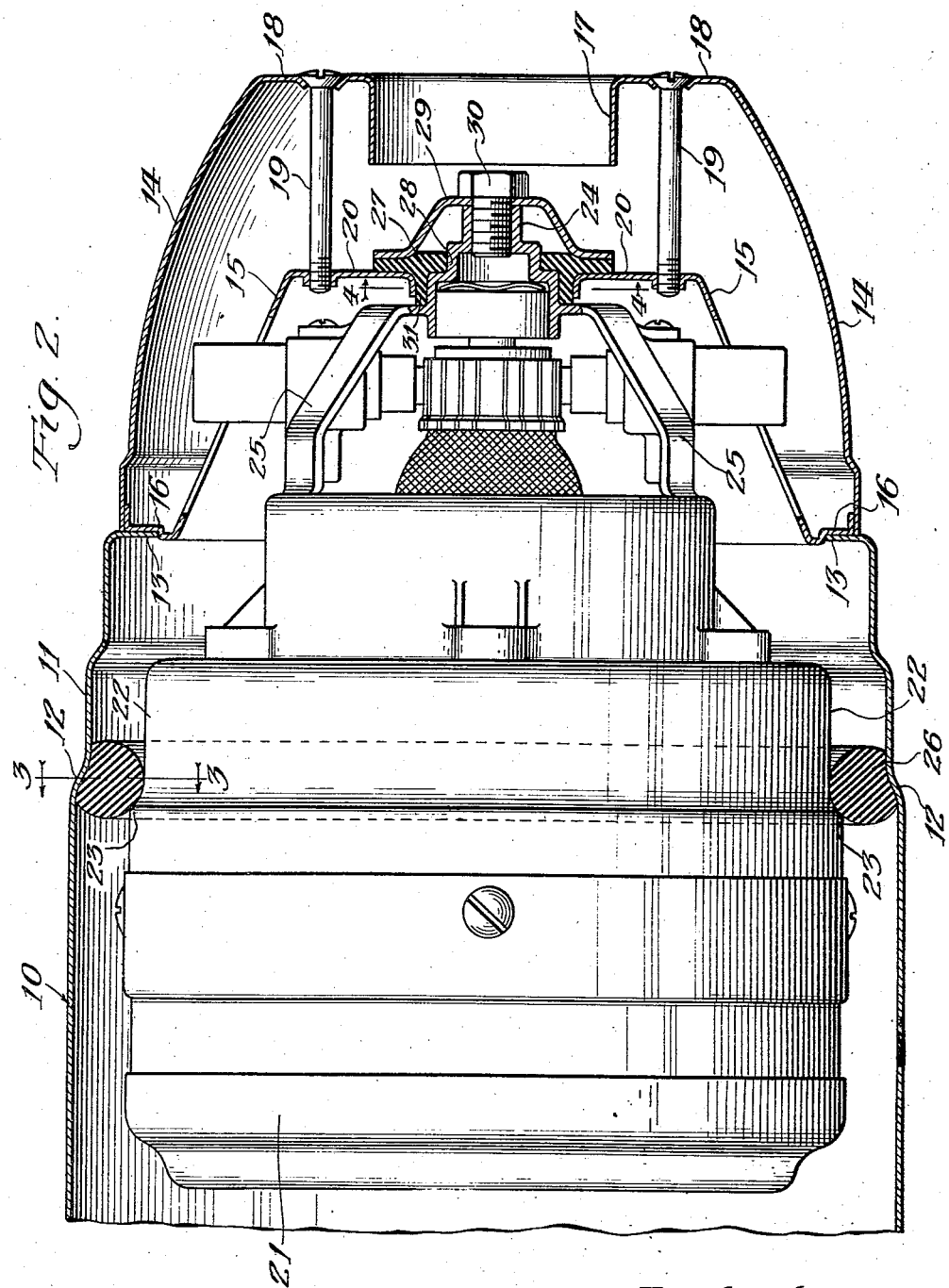

Patented Apr. 29, 1941

2,240,150

UNITED STATES PATENT OFFICE 2,240,150

SUCTION CLEANER MOTOR MOUNTING

Arthur W. Seyfried, Racine, Wis., assignor to Scovill Manufacturing Company, Waterbury, Conn., a corporation of Connecticut Application March 18, 1940, Serial No. 324,635

5 Claims. (Cl. 248—26)

This invention relates to suction cleaner motor mountings, and particularly to means for mounting a power unit within the housing of a suction cleaner of the kind known as "tank type" cleaners.

The object of the invention is to provide a mounting for yieldingly supporting the motor or power unit within the cleaner housing and spacing it from the housing in such manner that the motor or power unit does not contact the cleaner housing.

Another object is to provide a motor mounting comprising compressible means whereby the motor unit may be supported in the cleaner housing and an air seal provided between the motor and housing intermediate opposite ends of the motor or power unit housing.

Preferably the motor mounting consists of a minimum number of supporting members so that the motor or power unit is in indirect contact with the cleaner housing only at one end of the housing and circumferentially at one place intermediate the ends of the motor or power unit housing, and otherwise out of contact, both directly and indirectly.

The mounting shown and described results in very quiet operation of the motor, minimum vibration and wear of parts, and provides an effective air seal preventing the circulation of air through the fans within the housing.

In the drawings:

Fig. 1 is a side elevational view of a tank type suction cleaner.

Fig. 2 is a longitudinal, vertical sectional view of the exhaust end of the cleaner, showing a motor and mounting embodying my invention installed in the cleaner.

Fig. 3 is a transverse, vertical sectional view, taken in the plane of the line 3—3 of Fig. 2.

Fig. 4 is a transverse, vertical sectional view, taken in the plane of the line 4—4 of Fig. 2, some of the parts being broken away.

In that embodiment of the invention shown in the drawings, the cleaner housing comprises a cylindrical body 10 having at least one offset portion 11 of decreased diameter whereby a circumferential shoulder 12 is formed inwardly of the end of the body 10. The end is defined by a formed flange 13 extending circumferentially of the body at the end shown in Fig. 2. At the end of the body 10 is an outer end bell or cap 14 and an inner bell or cap 15. The bell 15 has a member 16 arranged to abut the flange 13 and being welded thereto. The center of the outer bell 14 is open, the opening being defined by the inwardly directed flange 17, and the wall 18 between said flange 17 and bell wall 14 is substantially flat and apertured to receive screw bolts 19 which engage the wall 20 which is part of the inner end bell 15.

The motor housing 21 is of less diameter than the housing body 10, and in the present embodiment it encloses the motor and the fan unit (not shown). The housing 21 is provided with an offset portion 22 of decreased diameter whereby a circumferential shoulder 23 is formed on the motor housing, the parts 22 and 23 being substantially complemental to the parts 11 and 12 of the cleaner housing, but located slightly laterally of the cooperating parts of the cleaner housing. The outer end of the motor housing 21 is provided with a concentric, internally screw threaded member 24 connected to the motor housing by strap members 25 and arranged to extend outwardly of the motor supporting inner end bell 15.

To support the motor housing 21 and contents within the cleaner housing, I provide a resilient ring 26 which is located in the housing 10 to bear against the inside of the shoulder 12 and the outside of the shoulder 23 of the motor housing 21. The ring 26 preferably is round in cross section, and large enough so that it is compressed to some extent between the housings but supports the motor housing in spaced relation to the cleaner housing. The outer end or sleeve member 24 of the motor housing is supported and drawn toward the outer end of the cleaner housing by means of a resilient collar 27 fitted on the shoulder 28 of the member 24 and bearing against the wall 20 of the inner end bell 15, a clamping plate 29 bearing on the resilient collar 27, and a screw 30 arranged to engage the member 24 to hold the clamping plate 29 firmly against the collar 27. By tightening the screw 30, the parts 28 and 29 are drawn together and the resilient collar 27 is compressed between them. This action also draws the shoulder 23 toward the shoulder 12 and produces a snug engagement between the motor housing 21, cleaner housing 10 and resilient ring 26. The resilient collar 27 not only spaces the wall 20 and clamping plate 29 from each other, but the flange 31 on the collar 27 yieldingly supports the motor housing and spaces said housing end member 24 from the inner end bell 15.

In the claims, the inner end bell 15 is comprehended within the phrase "open end of the cleaner housing" because functionally it is a part of the housing, and the outer bell member 14—18 is merely a cover.

By the means described, the motor or power unit is yieldingly supported in the cleaner housing and the mounting means prevents any direct contact between the motor housing and the cleaner housing. Noise, wear and vibration are minimized and the efficiency of the mechanism greatly enhanced.

Changes may be made in details of construction without departing from the scope of my invention.

I claim:

1. A suction cleaner motor mounting comprising a cleaner housing having an open end and a circumferential shoulder on its inner surface at a distance from said open end, a motor housing within the cleaner housing, said motor housing having a circumferential shoulder on its outer surface, a resilient ring between said housings engaged by said shoulders, the outer end of the motor housing being accessible through said open end of the cleaner housing, and means secured to the outer end of the motor housing and bearing on the outer surface of the cleaner housing adjacent said open end, said means drawing the motor housing in an axial direction toward the open end of the cleaner housing and thereby compressing said resilient ring between said shoulders by pressure exerted by said motor housing shoulder against said resilient ring and cleaner housing shoulder.

2. A suction cleaner motor mounting comprising a cleaner housing having an open end and a circumferential shoulder on its inner surface at a distance from said open end, a motor housing within the cleaner housing, said motor housing having a circumferential shoulder on its outer surface, the shoulder on the motor housing being located a greater distance from the open end of the cleaner housing than the shoulder on the cleaner housing, a resilient ring between said housings engaged by said shoulders, the outer end of the motor housing being accessible through said open end of the cleaner housing, and means secured to the outer end of the motor housing and bearing on the outer surface of the cleaner housing adjacent said open end, said means drawing the motor housing in an axial direction toward the open end of the cleaner housing and thereby compressing said resilient ring between said shoulders by pressure exerted by said motor housing shoulder against said resilient ring and cleaner housing shoulder.

3. A suction cleaner motor mounting comprising a cleaner housing having an open end and a circumferential shoulder on its inner surface at a distance from said open end, a motor housing within the cleaner housing, said motor housing having a circumferential shoulder on its outer surface, a resilient ring between said housings engaged by said shoulders, the outer end of the motor housing being accessible through said open end of the cleaner housing, and means secured to the outer end of the motor housing and bearing on the outer surface of the cleaner housing adjacent said open end, said means comprising a screw threaded member on the motor housing, a separable clamping plate bearing on the cleaner housing, and a screw threaded member engaging said first screw threaded member drawing the clamping plate and motor housing toward each other on opposite sides of said cleaner housing adjacent its open end, and thereby compressing said resilient ring between said shoulders by pressure exerted by said motor housing shoulder against said resilient ring and cleaner housing shoulder.

4. A suction cleaner motor mounting comprising a cleaner housing having an open end and a circumferential shoulder on its inner surface at a distance from said open end, a motor housing within the cleaner housing, said motor housing having a circumferential shoulder on its outer surface, a resilient ring between said housings engaged by said shoulders, the outer end of the motor housing being accessible through said open end of the cleaner housing, and means secured to the outer end of the motor housing and bearing on the outer surface of the cleaner housing adjacent said open end, said means comprising a screw threaded member on the motor housing, a separable clamping plate and resilient collar, the resilient collar being compressed thereby between said clamping plate and the outer end of the cleaner housing, and a screw threaded member engaging said first screw threaded member drawing the clamping plate and motor housing toward each other on opposite sides of said cleaner housing adjacent its open end, and thereby compressing said resilient ring between said shoulders by pressure exerted by said motor housing shoulder against said resilient ring and cleaner housing shoulder.

5. A suction cleaner motor mounting comprising a cleaner housing having an open end and a circumferential shoulder on its inner surface at a distance from said open end, a motor housing within the cleaner housing, said motor housing having a circumferential shoulder on its outer surface, a resilient ring between said housings engaged by said shoulders, the outer end of the motor housing being accessible through said open end of the cleaner housing, said motor housing having a screw threaded sleeve on its outer end, a resilient collar surrounding the sleeve and bearing on the outer surface of the cleaner housing, a clamping plate bearing on the resilient collar and pressing it against the cleaner housing, and a screw threaded bolt engaging the sleeve and forcing the clamping plate against the resilient collar and drawing the motor housing toward the clamping plate on opposite sides of the cleaner housing adjacent its open end, thereby compressing said resilient ring between said shoulders by pressure exerted by said motor housing shoulder against said resilient ring and cleaner housing shoulder.

ARTHUR W. SEYFRIED.